Patented Sept. 29, 1953

2,653,937

UNITED STATES PATENT OFFICE 2,653,937

AMMELINE SALTS

Donald W. Kaiser, Old Greenwich, Conn., assignor to American Cyanamid Company, New York, N. Y., a corporation of Maine No Drawing. Application September 16, 1950, Serial No. 185,339

3 Claims. (Cl. 260—249.8)

The present invention relates to a novel method of making ammelines and their hydrohalide addition salts.

It is an object of this invention to prepare such salts by reacting a dicyanoguanidine, such as potassium dicyanoguanidine, with hydrochloric or hydrobromic acid. Other objects will be apparent from the description following.

It has been found that when a dicyanoguanidine or a metal salt thereof is reacted with aqueous hydrochloric or hydrobromic acid, the corresponding ammeline hydrohalide salt is formed.

In contradistinction to fusion processes for making ammeline (as from dicyandiamide, potassium cyanate, urea, and the like) the method of this invention provides a high purity ammeline which is easily recovered. Ammeline is amorphous in character, while ammeline hydrohalide salts are nicely crystalline as herein prepared.

The process is a general one for the dicyanoguanidines, and while a dicyanoguanidine may be used as such, it is preferred to liberate same in aqueous solution from one of its metal salts, as the free compound when isolated is somewhat unstable. It is preferred to use one of the alkali metal salts such as potassium dicyanoguanidine, but any of the other salts, such as ammonium, zinc, calcium, and the like, are suitable. The dicyanoguanidine salts, as well as the free compound, may be obtained by the process given in U. S. Patent 2,371,100.

In using a metal salt of dicyanoguanidine it is necessary to add sufficient acid to combine with each metal valence in order to release the free dicyanoguanidine molecule, which may then be converted to the ammeline salt. However, better yields are obtained if a considerable excess of acid is used, excellent results being obtained when the acid:dicyanoguanidine mole ratio is about 5:1.

It is preferred to conduct the reaction at a temperature within the range 50°–100° C., as below this temperature range the yield of ammeline salt is small. Still more preferably a temperature range of 70°–100° C. is employed.

The following examples illustrate without limiting the invention.

EXAMPLE 1

*The reaction of potassium dicyanoguanidine with hydrochloric acid*

A solution containing 31 g. of potassium dicyanoguanidine in 150 cc. of water was slowly added to 200 g. of concentrated hydrochloric acid. The temperature was not allowed to fall below 60° C. A colorless precipitate of ammeline hydrochloride was formed, and after the reaction mass had been cooled it was recovered by filtration and washed with acetone. The crude product weighed 33 g. It can be purified by recrystallizing from dilute hydrochloric acid.

EXAMPLE 2

*The reaction of potassium dicyanoguanidine with hydrobromic acid*

200 g. of 40–42% hydrobromic acid was warmed on a steam bath to about 93° C. The source of heat was then removed and 14.7 g. of potassium dicyanoguanidine added in small portions over a 15 minute period, during which time a vigorous exothermic reaction occurred. The temperature did not fall below 60° C. On cooling to 10° C. crystals separated, which were filtered, rinsed with acetone, and dried to give 23.6 g. of ammeline hydrobromide.

The aliphatic-, cycloaliphatic-, and aralkyl-substituted dicyanoguanidines can be similarly reacted with halogen acids to provide the corresponding substituted ammelines in accordance with the equation:

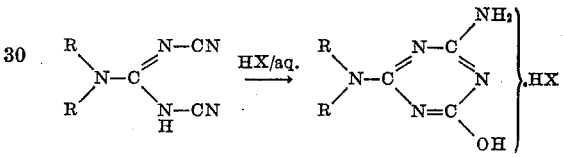

in which R is hydrogen or an aliphatic, cycloaliphatic, or aralkyl radical. The R's can be the same or different. Among radicals suitable for the reaction are ethyl, propyl, isopropyl, butyl, isobutyl, amyl, hexyl, dodecyl, 2-ethylhexyl, cyclohexyl, benzyl, xylyl, phenylethyl, phenylpropyl, mesitylyl, cumyl, and the like.

The substituted dicyanoguanidines can be made by the method of the first part of Example 3 following, from the corresponding substituted cyanoguanidines, which in turn can be prepared by the general methods disclosed in U. S. Patent No. 2,455,807.

EXAMPLE 3

*Reaction of cyclohexyldicyanoguanidine with hydrochloric acid*

The potassium cyclohexyl dicyanoguanidine is made by dissolving 82.5 g. of cyclohexylcyanoguanidine (prepared by the method of U. S. Patent No. 2,455,807) in 500 ml. of acetone. To this solution is added 64.6 g. of 86.6% potassium hydroxide. A slurry results. 25.5 ml. of cyanogen chloride vapor is added to the stirred slurry at 10°–12° C. over a two hour period, after which the mixture is stirred for an additional hour, filtered, and the product washed with acetone. The product consists of the potassium salt of the cyclohexyldicyanoguanidine together with potassium chloride. This mixture, after crystallization from hot water with treatment by activated charcoal, yields colorless plates of the potassium salt free of potassium chloride.

To a solution of 0.2 moles (46 g.) of said potassium cyclohexyldicyanoguanidine in 150 ml. of water, 200 ml. of concentrated hydrochloric acid was added, while maintaining the solution at at least 60° C. Much heat was evolved, and after two hours the temperature was permitted to fall to 30° C., and the solid which had separated was filtered. The damp material, which had partially dried overnight at room temperature, weighed 50 g. and possessed a strong odor of hydrogen chloride. The solid was slurried in acetone, filtered, washed with acetone, and air dried to provide N-cyclohexylammeline base. (Air drying completed the elimination of hydrogen chloride.) When recrystallized from hot water the free base was found to be relatively infusible, decomposing above 330° C. Analysis gave values in agreement with N-cyclohexylammeline.

|  | Percent C | Percent H | Percent N |
|---|---|---|---|
| Calculated for $C_9H_{15}N_5O$ | 51.91 | 7.18 | 33.52 |
| Found | 51.86 | 7.45 | 32.85 |
|  | 51.83 | 7.59 | 32.78 |

The free ammeline bases of the above examples may be recovered by neutralization with an alkali, following the well known procedures.

The compounds of the present invention are useful in the preparation of dyes, pharmaceuticals, synthetic resins, and the like.

This application is a continuation-in-part of applicant's copending Serial No. 104,589 filed July 13, 1949, now abandoned.

While the invention has been described with particular reference to specific embodiments, it is to be understood that it is not to be limited thereto but is to be construed broadly and restricted solely by the scope of the appended claims.

I claim:

1. The method of preparing an ammeline hydrohalide which consists in subjecting a dicyanoguanidine to the action of a mixture comprising essentially a halogen acid of the group consisting of HCl and HBr in aqueous solution, at a temperature within the range of 50°–100° C., the acid being in stoichiometric excess over the dicyanoguanidine, the excess being calculated on a free dicyanoguanidine basis, and separating the thus-formed hydrohalide.

2. The method according to claim 1 in which the halogen acid is hydrochloric acid.

3. The method according to claim 1 in which the halogen acid is hydrobromic acid.

DAVID W. KAISER.

References Cited in the file of this patent

UNITED STATES PATENTS

| Number | Name | Date |
|---|---|---|
| 2,371,100 | Kaiser | Mar. 6, 1945 |
| 2,392,607 | Nagy | Jan. 8, 1946 |
| 2,392,608 | Nagy | Jan. 8, 1946 |